United States Patent [19]
Nishimura

[11] Patent Number: 5,534,737
[45] Date of Patent: Jul. 9, 1996

[54] COMPOSITE MOTOR

[76] Inventor: Masayuki Nishimura, 33 Nishimachi 2-Chome, Ayabe-shi, Kyoto 623, Japan

[21] Appl. No.: 361,200

[22] Filed: Dec. 21, 1994

[51] Int. Cl.⁶ .................................................. H02K 16/00
[52] U.S. Cl. ............................. 310/112; 310/83; 310/89; 310/156; 310/114; 74/421 A; 74/661
[58] Field of Search ................................... 310/112, 114, 310/181, 83, 89, 156, 248; 74/661, 421 A

[56] References Cited

U.S. PATENT DOCUMENTS

| | | | |
|---|---|---|---|
| 4,323,828 | 4/1982 | Terada | 310/112 |
| 4,609,842 | 9/1986 | Aleem | 310/114 |
| 4,752,706 | 6/1988 | Meszaros | 310/83 |

FOREIGN PATENT DOCUMENTS

| | | |
|---|---|---|
| 64-1457 | 1/1989 | Japan . |
| 1-17344 | 3/1989 | Japan . |
| 1-91640 | 4/1989 | Japan . |
| 1-133549 | 5/1989 | Japan . |

*Primary Examiner*—R. Skudy
*Attorney, Agent, or Firm*—Banner & Allegretti, Ltd.

[57] ABSTRACT

A plurality of rotating bodies each consisting of an armature, a permanent magnet rotor, or the like are rotatably supported in parallel and rotary shafts thereof are gear-connected to each other so that they may be interlockingly rotatable. Between the mutually nearest positions between respective outer peripheries of the adjacent rotating bodies and inner wall surfaces of the relevant yoke on first- or second-, half rotation sides of the rotating bodies as viewed in the rotation direction, partitioning walls are disposed so as to block the passage of the magnetisms between the adjacent rotating bodies while, on the other hand, opening portions are secured on the other rotation sides thereof as viewed in the rotation direction so as not to block the passage of the magnetisms between the adjacent rotating bodies, whereby forces of magnetic attraction or repulsion act to promote the interlocking rotations of the rotating bodies.

4 Claims, 6 Drawing Sheets

COMPOSITE MOTOR

BACKGROUND OF INVENTION

The present invention relates to a composite motor which can be used, for example, in transport facilities including a motor car, etc., as well. A conventional motor has only a single armature, a single field rotor, or the like as a rotary body that is connected to an output shaft thereof. In order to provide a higher output and a higher efficiency, the configuration of the armature, field rotor, or the like as well as the configuration of a stationary field member or the like has hitherto been contrived while, on the other hand, development of stronger magnets, improvement of commutators, brushes, and the like, and contrivance of electric commutations have hitherto been made.

OBJECT OF INVENTION

An object of the present invention is to provide a composite motor having a high output and high efficiency, which has been developed from a viewpoint that is different from that at which the above-mentioned conventional contrivances, improvements, and the like were made.

BRIEF DESCRIPTION OF DRAWINGS

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

In the drawings affixed hereto.

DESCRIPTION OF INVENTION

Figure 1:
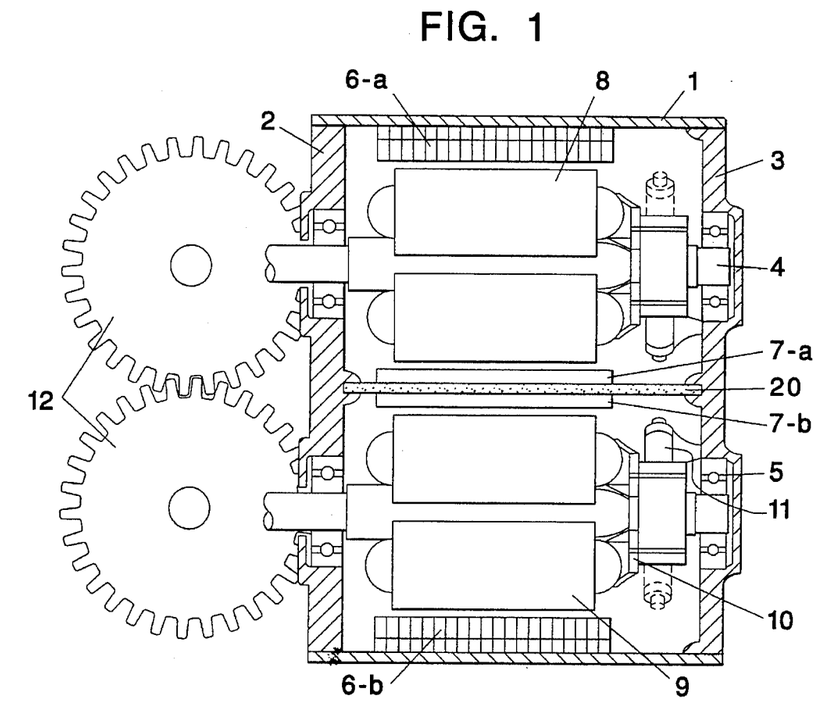
FIG. 1 is a longitudinal sectional view showing a composite motor having two armatures juxtaposed with each other in a preferred mode of embodiment of the present invention.
Figure 2A:
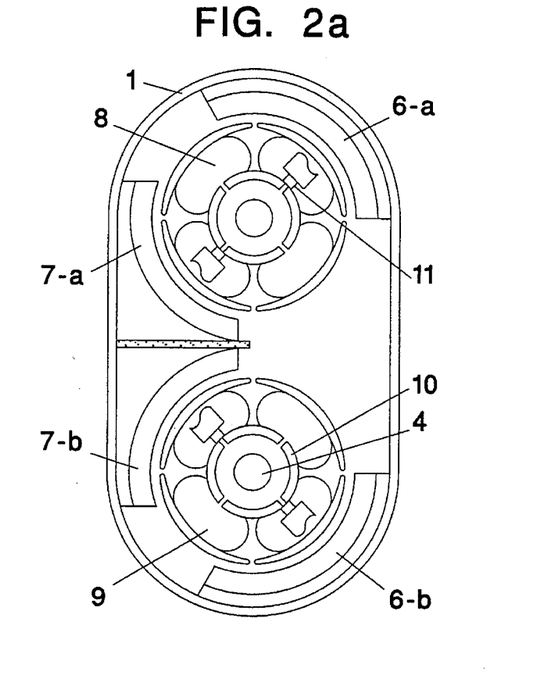
FIG. 2(a) is a cross sectional view showing the composite motor shown in FIG. 1.
Figure 2B:
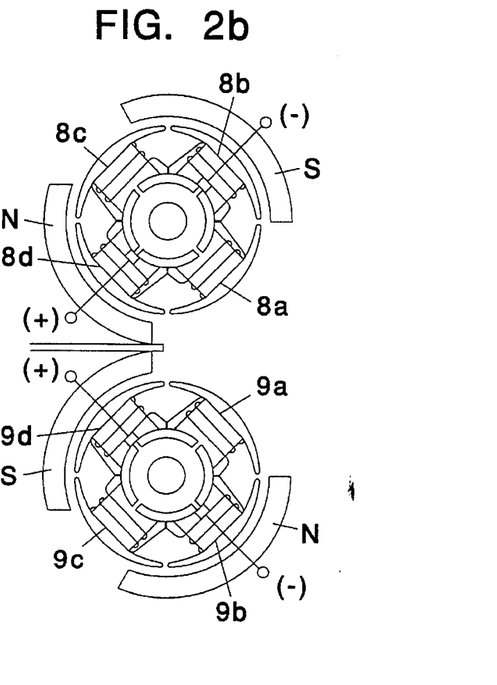
FIG. 2(b) illustrates the outline of an electric wiring of the composite motor shown in FIG. 1.

In a first mode of embodiment illustrated in FIG. 1 and FIGS. 2(a) and 2(b), a housing has brackets 2, 3 at the front and back sides thereof, respectively, and has a yoke 1 as a surrounding member. A pair of rotary shafts 4 are rotatably supported in parallel by the front and back brackets 2, 3 of the housing through their corresponding bearings 5. 4-pole armatures 8, 9 are secured to the rotary shafts 4, respectively. And the 4-pole armatures 8, 9 have coils 8a to 8d and coils 9a to 9d, respectively, both of which are formed on iron cores radially extending in four directions. On the outside of the front bracket 2, gears 12 (each shown in a condition wherein it is rocked through 90 degrees and seen from the direction of the rotary shaft 4) are mounted on the rotary shafts 4 in a condition wherein both mesh with each other. In this mode of embodiment, the rotary shaft 4 having the armature 8 is rotatable clockwise and the rotary shaft 4 having the armature 9 rotatable counterclockwise, so that both may be interlockingly rotatable.

Further, between a position, at which respective outer peripheries of the adjacent armatures 8, 9 are nearest to each other, and an inner wall surface of the yoke 1 on a second-half armature rotation side as viewed in the rotation direction, a partitioning wall 20 is so provided as to magnetically block between the two armatures 8, 9 and has its ends fitted into the front and rear brackets 2, 3 while, on the other hand, in an area between the mutually nearest position of the both outer peripheries and an inner wall surface of the yoke 1 on a first-half armature rotation side as viewed in the rotation direction, an opening portion (indicated in FIG. 2(a) by a substantially triangular blank space) is secured so as not to block the magnetism between the armatures 8 and 9. Note that since the partitioning wall 20 is fixed to the front and rear brackets 2, 3 and also to the yoke 1 as mentioned above, it will contribute to reinforcing the housing as a whole, too.

Further, stationary field members 7-a and 6-a which respectively serve as an N-polar member and an S-polar member are disposed in such a manner as to surround an outer peripheral portion of one armature 8 close to the partitioning wall 20 and a portion opposing the same, respectively. Further, an S-polar and an N-polar stationary field member, 7-b and 6-b, are disposed in such a manner as to surround an outer peripheral portion of the other armature 9 close to the partitioning wall 20 and a portion thereof that opposes the same, respectively.

With the above-mentioned structure, as shown in FIG. 2(b), when a specified level of d.c. voltage is applied to a commutator 10 through a brush 11, a current that has flown in from a (+)-polar brush 11 is caused to branch through the commutator 10 and then flows through the armatures 8, 9, whereby the current is collected into a (−)-polar brush 11. At this time, coils 8c, 8d and coils 9a,9b are each connected to the (+) terminal whereby the same magnitude of current flows in the same direction and coils 8a, 8b and coils 9c, 9d are each connected to the (−) terminal. As a result, one armature 8 starts to rotate clockwise and the other armature 9 to rotate counterclockwise. Note that after a ¼ rotation of each armature 8, 9, the coils 8*d*, 8*a* and the coils 9*b*, 9*c* are each connected to the (+) terminal while, on the other hand, the coils 8*b*, 8*c* and the coils 9*d*, 9*a* are each connected to (−) terminal, which results in that a rotating force generates in each armature 8, 9 in the same direction as mentioned above. Through repetitions of such operations as mentioned above, required continuous rotations are obtained.

When the above-mentioned rotations are made, a force of magnetic attraction acts between the coil 8*a* and the coil 9*a* of the armatures 8, 9 that oppose each other with the opening portion in between, and, after a ¼ rotation thereof, this force acts between the coil 8*b* and the coil 9*b*. This force of magnetic attraction causes the occurrence of rotary movements, contributing to promoting the above-mentioned rotations. As a result, energy consumption is much reduced and, at the same time, the rotation becomes smooth and can have a high level of output. The gears 12 which are provided on the rotary shafts 4 in a condition wherein they mesh with each other prevent the occurrence of any slight deviation in synchronization between the synchronized rotations of the rotary shafts 4, thereby enabling the performance of completely synchronized rotations of the armatures 8, 9 as well as the resulting reliable generation of the above-mentioned rotation-promoting action.

Figure 3:
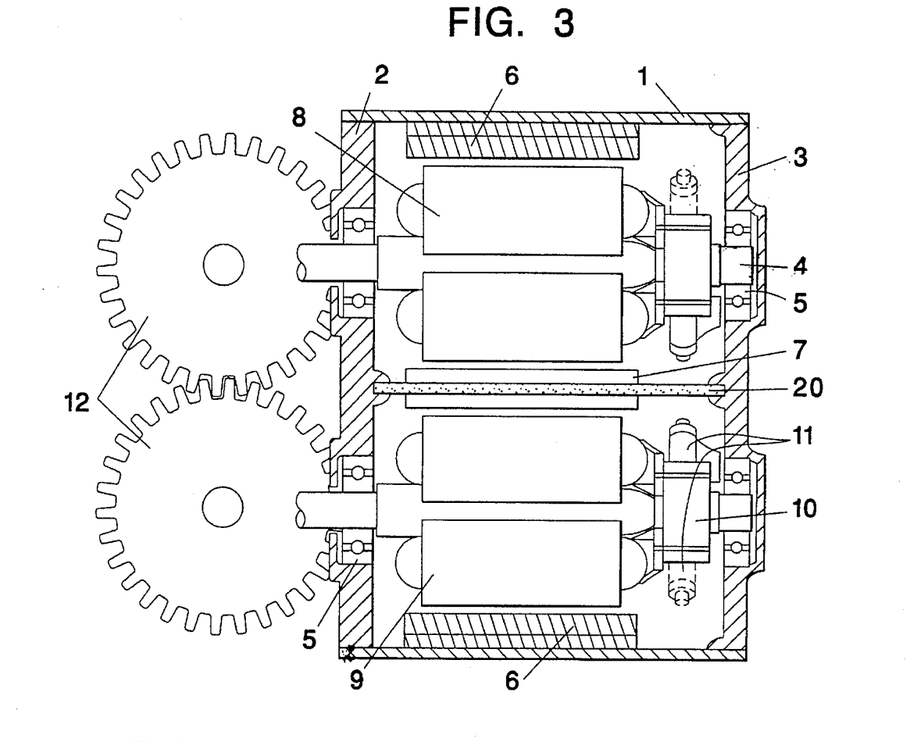
FIG. 3 is a longitudinal sectional view showing a composite motor having two armatures juxtaposed with each other in another preferred mode of embodiment of the present invention.
Figure 4A:
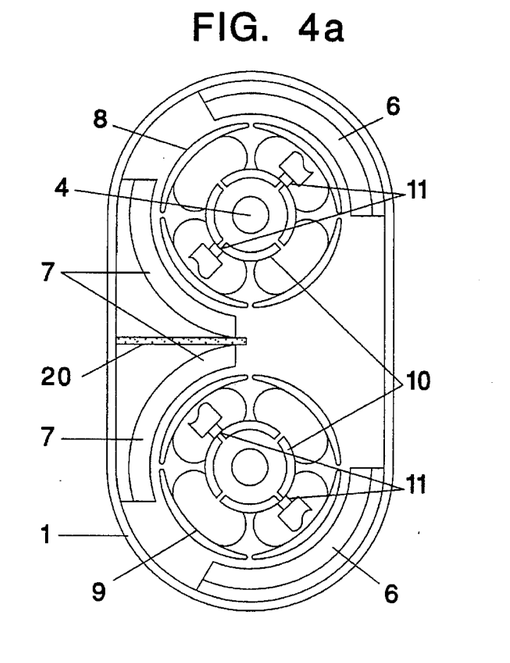
FIG. 4(a) is a cross sectional view showing the composite motor shown in FIG. 3.
Figure 4B:
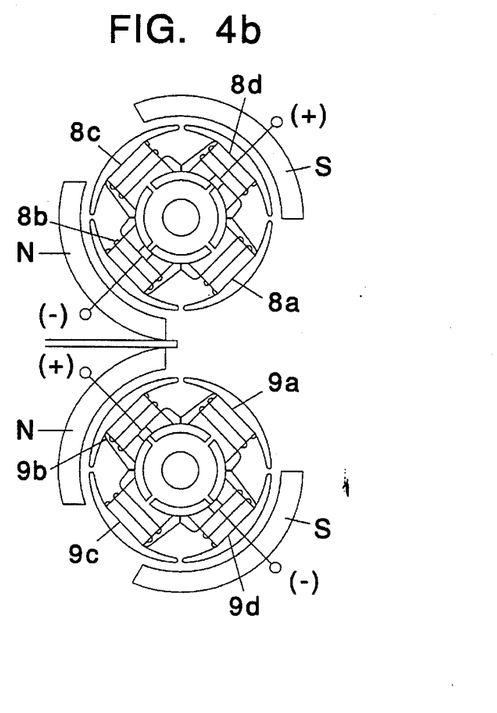
FIG. 4(b) illustrates the outline of an electric wiring of the composite motor shown in FIG. 3.

Note that, in the above-mentioned mode of embodiment, it is possible to easily increase the number of the poles of each armature or to easily use an armature structure which is different from the above-mentioned armature structure, in place thereof. The output of the above-mentioned composite motor can be taken out, as required, from each rotary shaft or gear through a transmission member. Next, in a second mode of embodiment illustrated in FIG. 3 and FIGS. 4(*a*) and 4(*b*), the composite motor has the same structure as the structure in the above-mentioned mode of embodiment, excepting that the rotary shaft 4 having the armature 8 is rotated counterclockwise and the rotary shaft 4 having the armature 9 is rotated clockwise, so that both maybe interlockingly rotatable; that the partitioning wall 20 is provided between the mutually nearest position of the outer peripheries of the adjacent armatures 8, 9 and the inner wall surface of the yoke 1 on the first-half armature rotation side as viewed in the rotation direction so as to block the passage of magnetism between the armatures 8 and 9 while, on the other hand, the opening portion (shown in FIG. 4(*a*) by a substantially triangular blank space) is secured between the mutually nearest position of the outer peripheries of the adjacent armatures 8, 9 and the inner wall surface of the yoke 1 on the second-half armature rotation side as viewed in the rotation direction so as not to block the passage of the magnetism between the armatures 8 and 9; that the N-polar and the S-polar stationary field member, 7 and 6, are disposed so as to surround the portions of the outer peripheries of the armatures 8, 9 close to the partitioning wall 20 and the portions thereof that oppose the same; and that a force of magnetic repulsion acts between the coil 8*a* and the coil 9*a* of the armatures 8, 9 which oppose each other with the opening portion in between and this force of magnetic repulsion causes the occurrence of rotary movements, contributing to promoting the rotations of the armatures 8, 9.

With the above-mentioned structure, the coils 8*a*, 8*b* and the coils 9*a*, 9*b* are each connected to the (+) terminal so that the same magnitude of current flows through the armatures 8, 9 in the same direction while, on the other hand, the coils 8*c*, 8*d* and the coils 9*c*, 9*d* are each connected to the (−) terminal, resulting in that one armature 8 starts to rotate counterclockwise and the other armature 9 to rotate clockwise. Note that after a ¼ rotation of each armature 8, 9, the coils 8*b*, 8*c* and the coils 9*b*, 9*c* are each connected to the (+) terminal while, on the other hand, the coils 8*d*, 8*a* and the coils 9*d*, 9*a* are each connected to the (−) terminal, resulting in that a rotating force generates in each armature 8, 9 in the same direction as mentioned above. Through repetitions of such operations as mentioned above, required continuous operations are obtained.

When the above-mentioned rotations are made, a force of magnetic repulsion acts between the coils 8*a* and 9*a* of the armatures 8, 9 opposing each other with the opening portion in between and, after a ¼ rotation thereof, acts between the coils 8*b* and 9*b* thereof. This force of magnetic repulsion causes the occurrence of rotary movements, contributing to promoting the above-mentioned rotations. Note that in the area between the mutually nearest position of the outer peripheries of the armatures 8, 9 and the inner wall surface of the yoke 1 on the first-half armature rotation side as viewed in the rotation direction, the above-mentioned magnetic repulsive force acts in such a direction as to hinder the rotations of the armatures 8, 9 but since the partitioning wall 20 blocking the passage of the magnetism between the armatures 8 and 9 is provided in such area, generation of such a force of counter-rotation will be avoided.

Figure 5:
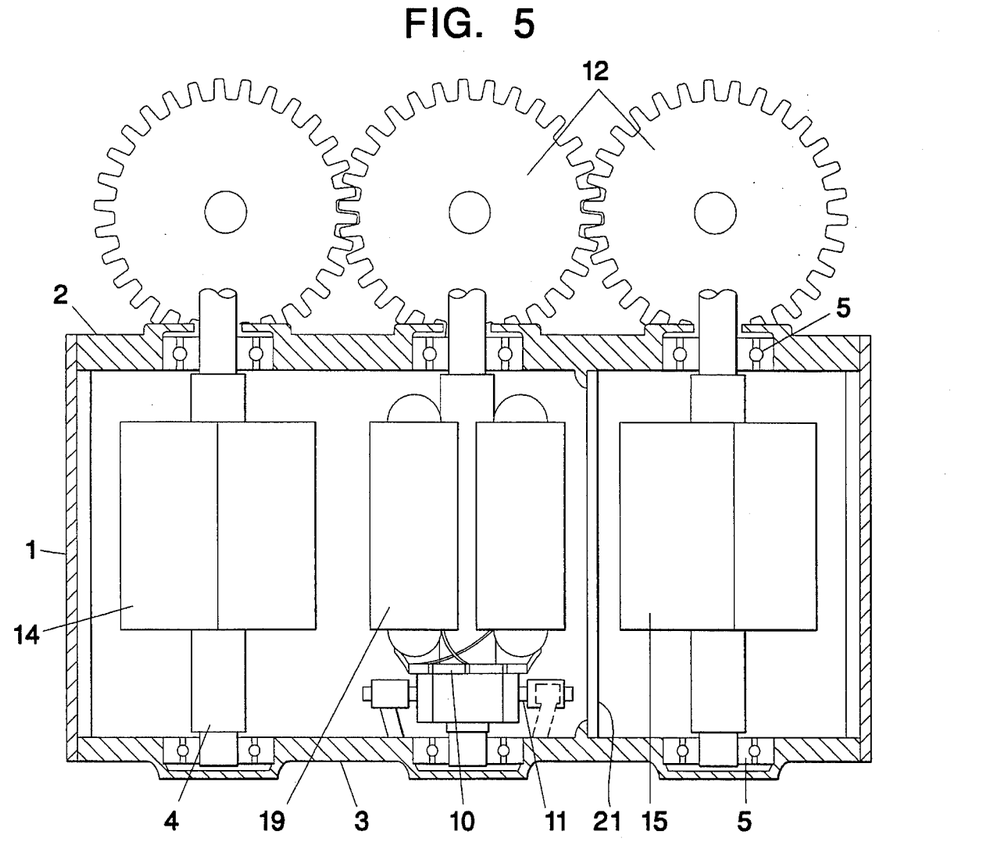
FIG. 5 is a longitudinal sectional view showing a composite motor having a single armature and two permanent magnet rotors on both sides thereof that are juxtaposed with each other in a preferred embodiment of the present invention.
Figure 6:
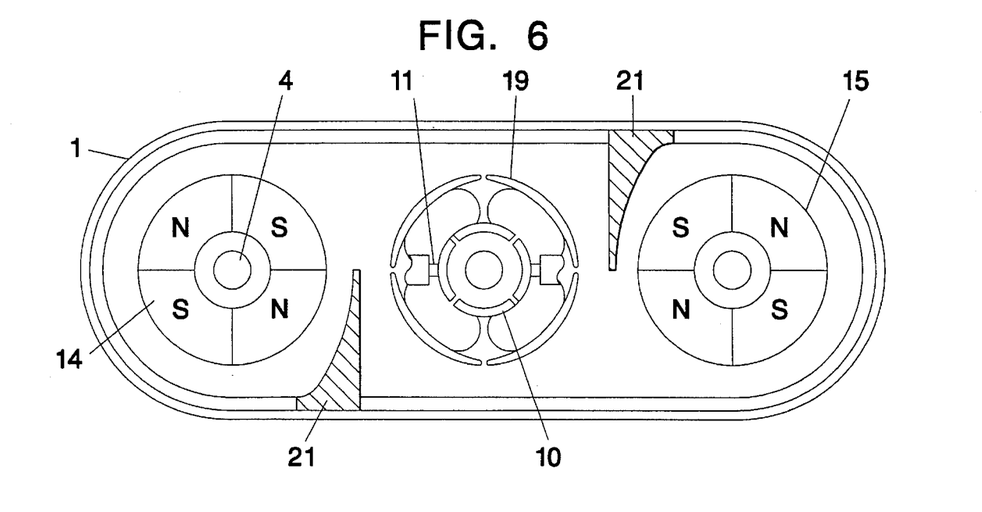
FIG. 6 is a cross sectional view showing the composite motor shown in FIG. 5.
Figure 7A:
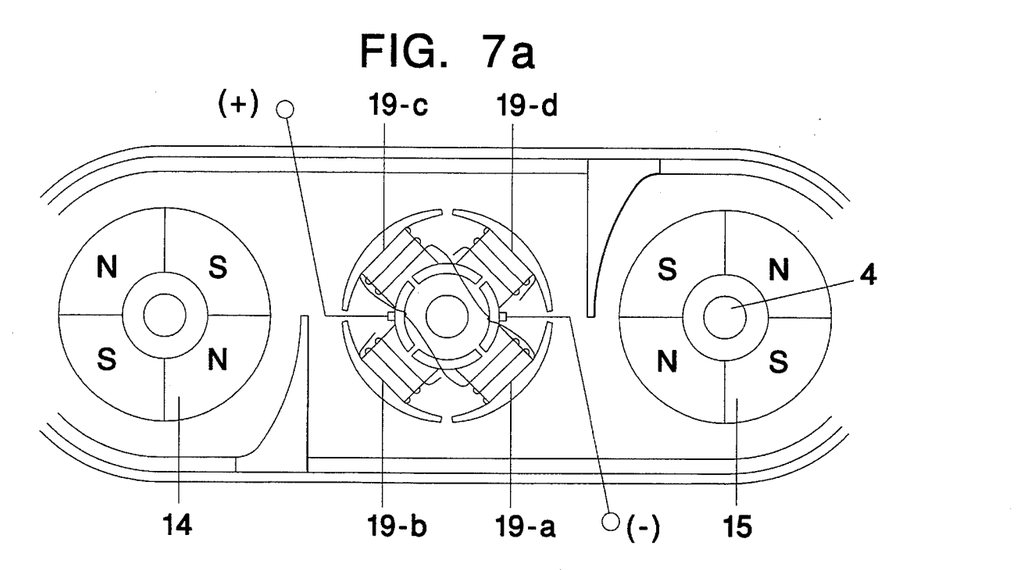
FIG. 7(a) illustrates the outline of an electric wiring of the composite motor shown in FIG. 5.
Figure 7B:
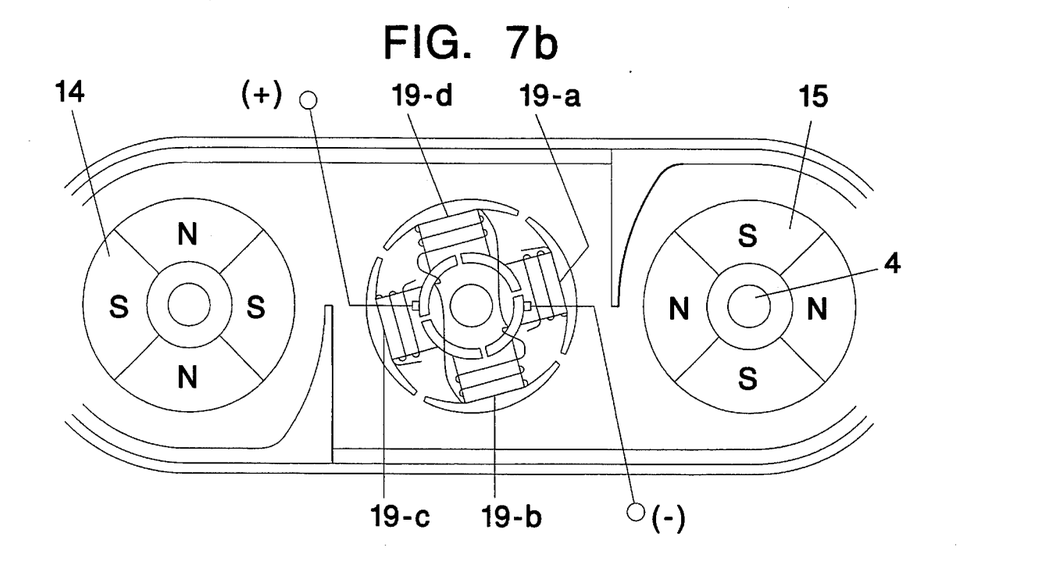
FIG. 7(b) illustrates the outline of an electric wiring of the composite motor shown in FIG. 5 that stands after the ¼ rotation thereof.

Further, in a third mode of embodiment shown in FIGS. 5 and 6 and FIGS. 7(*a*) and 7(*b*), three rotary shafts 4 are rotatably supported in parallel by the front and rear brackets 2, 3 of the housing through their corresponding bearings 5 in a manner that the three rotary shafts 4 are located on the same one flat plane. A 4-pole armature 19 is secured to the central rotary shaft 4 and has four radially extending iron cores on which coils 19*a* to 19*d* are formed. 4-pole permanent magnet rotors 14 and 15 are secured to each of the rotary shafts 4 on both sides of the central rotary shaft 4. Each of the permanent magnet rotors 14 and 15 has permanent magnets which are circularly disposed so that they may have alternately different magnetic poles of N, S, N, and S. The gears 12 (each shown in FIG. 5 in a condition wherein they are rocked 90 degrees and seen from the direction of the rotary shafts 4) are mounted, outside the front bracket 2, on the three rotary shafts 4, respectively, in such a condition that they mesh with each other. In this mode of embodiment, the central rotary shaft 4 is rotated counterclockwise and the rotary shafts on both sides thereof are each rotated clockwise so that the three rotary shafts may be interlockingly rotatable.

Further, between the mutually nearest positions between the both outer peripheries of the armature 19 and the permanent magnet rotors 14, 15 adjacent thereto, and the inner wall surfaces of the yoke 1 on the second-half armature rotation sides as viewed in the rotation direction, partitioning walls 21 are provided so as to block the passage of the magnetisms between the armature 19 and the adjacent permanent magnet rotors 14, 15 while, on the other hand, between the mutually nearest positions and the inner wall surfaces of the yoke 1 on the first-half armature rotation sides as viewed in the rotation direction, opening portions (shown in FIG. 6 by a substantially triangular blank space) are secured so as not to block the passage of the magnetisms between the armature 19 and the adjacent permanent magnet rotors 14, 15.

With the above-mentioned structure, as shown in FIG. 7(*a*), when a specified level of d.c. voltage is applied to the commutator 10 through the brush 11, the coil 19-*c* is connected to the (+) terminal and a force of magnetic attraction acts between this coil and the S pole of the permanent magnet rotor 14 while, on the other hand, the coil 19-a is connected to the (–) terminal and a force of magnetic attraction acts between this coil and the N pole of the permanent magnet rotor 15. As a result, the armature 19 starts to rotate counterclockwise and the permanent magnet rotors 14, 15 on both sides thereof start to rotate clockwise. Note that after the armature 19 and the permanent magnet rotors 14, 15 make their approximately ¼ rotations, as shown in FIG. 7(b), the coil 19b is connected to the (+) terminal and a force of magnetic attraction acts between this coil and the S pole of the permanent magnet rotor 15 while, on the other hand, the coil 19-d is connected to the (–) terminal and a force of magnetic attraction acts between this coil and the N pole of the permanent magnet rotor 14, whereby a rotating force generates in each of the armature 19 and the permanent magnet rotors 14, 15 in the same direction as mentioned above. Thus, required continuous rotations are obtained by sequentially energizing every second coil of the coils 19-a through 19-d of the armature 19.

When the above-mentioned rotations are made, forces of magnetic attraction act between the coils 19-c and 19-a of the armature 19 and their corresponding S- and N-polar permanent magnets of the permanent magnet rotors 14, 15 that oppose the former with the opening portions in between, thereby enabling the performance of the above-mentioned rotations. Note that although such forces of magnetic attraction must act between the mutually nearest positions between the outer peripheries of the relevant members, and the inner wall surfaces of the yoke 1 on the second-half armature rotation sides as viewed in the rotation direction, generation of such action of counter-rotation will be avoided because the partitioning wall 21 blocking the passage of the magnetism between the armature 19 and each of the permanent magnet rotors 14, 15 is provided in its corresponding one of such areas.

Although in the above-mentioned mode of embodiment explanation has been made as such that the armature and permanent magnet rotors each have a 4-polar structure, each of these members may be formed into a multi-polar structure such as, for example, an 8-polar structure, thereby smoother rotations are obtained.

Figure 8:
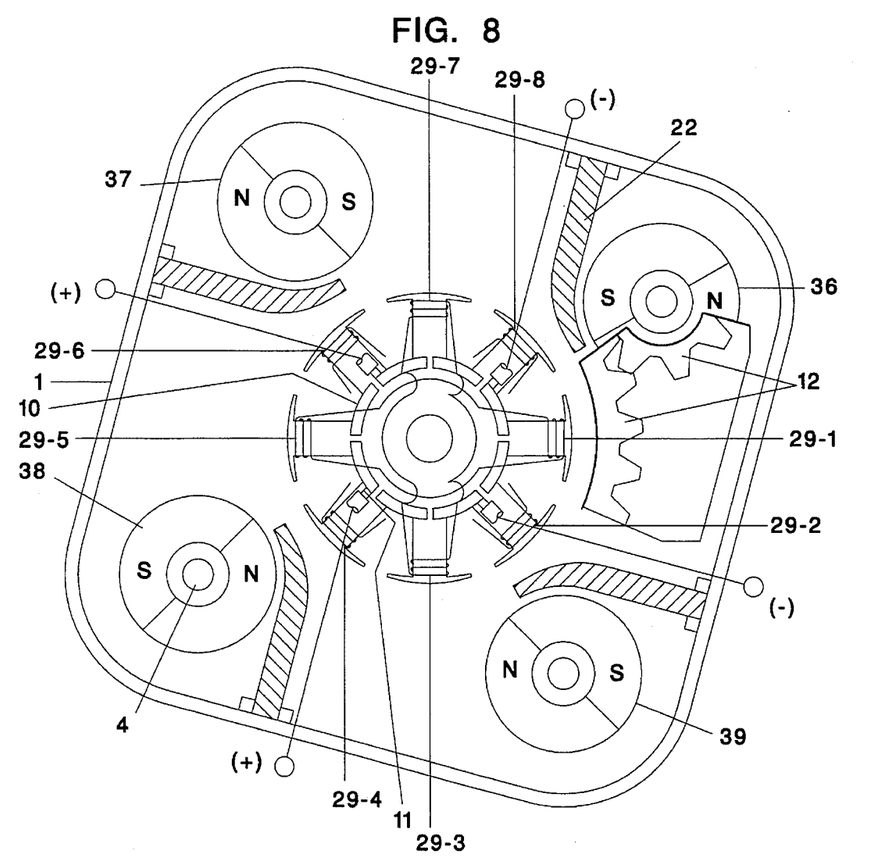
FIG. 8 is a longitudinal sectional view showing a composite motor having a single armature and four permanent magnet rotors surrounding it that are juxtaposed with each other in a preferred mode of embodiment of the present invention.

A composite motor in a fourth mode of embodiment, shown in FIG. 8, is one which has been prepared by somewhat modifying the design of the composite motor in the third mode of embodiment. In this fourth mode of embodiment, four parallel rotary shafts 4 are disposed around the central shaft 4 in parallel thereto and at equiangular intervals. An 8 pole armature 29 is secured to the central rotary shaft 4, and the armature 29 has coils 29-1 through 29-8 that are formed on the iron cores radially extending in eight directions, respectively. Bipolar permanent magnet rotors 36 to 39 are secured to the rotary shafts 4 surrounding the central rotary shaft 4, each bipolar permanent magnet rotor 36 to 39 having magnetic poles of N and S.

The gears 12 are mounted, as shown in FIG. 8 including a partially broken view, on the five rotary shafts 4, respectively, in such a condition that they mesh with each other. In this mode of embodiment, the central rotary shaft 4 is rotated counterclockwise and the rotary shafts 4 surrounding it are each rotated clockwise so that the five rotary shafts 4 may be interlockingly rotatable, wherein ⅛ rotation of the central rotary shaft 4 corresponds to each ½ rotation of the surrounding rotary shafts 4.

As in the case of the above-mentioned third embodiment mode, between the positions, at which the outer periphery of the armature 29 and the respective outer peripheries of the permanent magnet rotors 36 to 39 adjacent thereto are located nearest to each other, and the inner wall surfaces of the yoke 1 on the second-half rotor rotation sides as viewed in the rotation direction, partitioning walls 22 are provided so as to block the passage of the magnetism between the armature 29 and the permanent magnet rotors 36 to 39 while, on the other hand, between the above-mentioned positions and the inner wall surfaces of the yoke 1 on the first-half rotor rotation sides as viewed in the rotation direction, opening portions (each indicated in FIG. 8 by a substantially triangular blank space) are provided so as not to block the passage of the magnetism between the armature 29 and the permanent magnet rotors 36 to 39.

With the above-mentioned structure, when a specified level of d.c. voltage is applied to the commutator 10 through the brush 11, the coils 29-5 and 29-7 are connected to the (+) terminal and forces of magnetic attraction act between these coils and the S poles of the permanent magnet rotors 38, 37 while, on the other hand, the coils 29-1 and 29-3 are connected to the (–) terminal and forces of magnetic attraction act between these coils and the N poles of the permanent magnet rotors 36, 39, respectively, which results in that the armature 29 starts to rotate counterclockwise and the surrounding permanent magnet rotors 36 to 39 to rotate clockwise. Note that after the armature 29 makes its ⅛ rotation and each permanent magnet 36 to 39 makes its ½ rotation, the coils 29-2 and 29-4 are connected to the (+) terminal and forces of magnetic attraction act between these coils and the S poles of the permanent magnet rotors 36, 39 while, on the other hand, the coils 29-6 and 29-8 are each connected to the (–) terminal and forces of magnetic attraction act between these coils and the N-poles of the permanent magnet rotors 38, 37, respectively, which results in that a rotating force generates in each of the armature 29 and permanent magnet rotors 36 to 39 in the same direction as has been mentioned above. Thus, required continuous rotations are obtained by sequentially energizing every second one of the coils 29-1 through 29-8.

Additionally, in the above-mentioned fourth embodiment mode, the polar number of the armature may be further increased by a multiple of 4, or the number in pole of each permanent magnet rotor may be set to be 4, thereby a larger scale of structure can be provided.

Figure 9A:
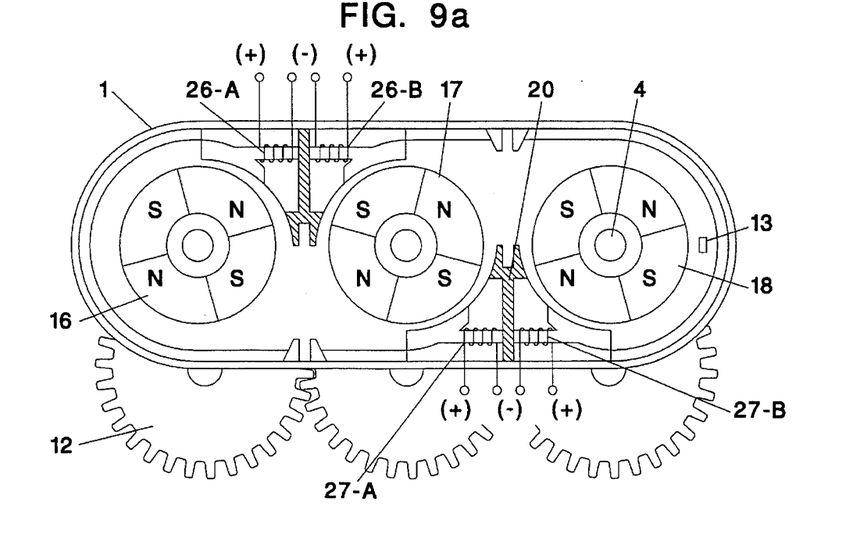
FIG. 9(a) is a longitudinal sectional view showing a composite motor having three permanent magnet rotors juxtaposed with each other in a preferred mode of embodiment of the present invention.
Figure 9B:
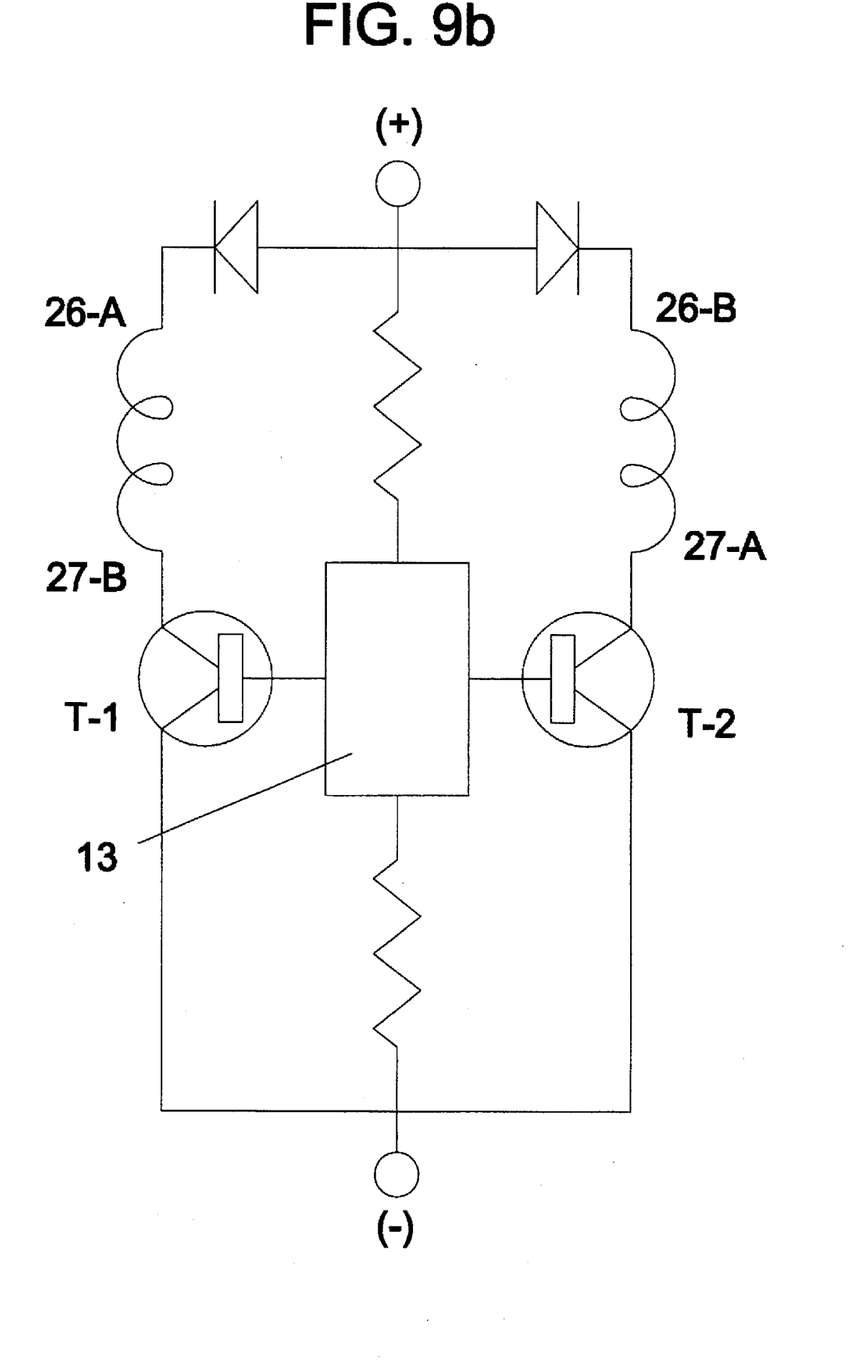
FIG. 9(b) illustrates the outline of an electric wiring of the composite motor shown in FIG. 9(a).

Next, in a fifth embodiment mode shown in FIGS. 9(a) and 9(b), three rotary shafts 4 may be disposed in parallel on the same one flat plane. As in the case of the third embodiment mode, 4-pole permanent magnet rotors 16 to 18 are secured to each rotary shaft 4. The gears 12 (each shown in FIG. 9 at a position slightly displaced from the corresponding rotary shaft 4) are mounted, outside the housing, on the three rotary shafts 4 in a condition wherein they mesh with each other. Thus, in this embodiment mode, the central rotary shaft 4 is rotated clockwise and the rotary shafts 4 on both sides thereof rotated counterclockwise so that both may be interlockingly rotatable.

Further, between the mutually nearest positions between the outer periphery of the central permanent magnet rotor 17 and the outer peripheries of the permanent magnet rotors 16, 18 adjacent thereto, and the inner wall surfaces of the yoke 1 on the second-half rotor rotation sides as viewed in the rotation direction, the partitioning walls 20 are provided so as to block the passage of the magnetisms between the permanent magnet rotors 16 and 17 and between the permanent magnet rotors 17 and 18 while, on the other hand, between the above-mentioned positions and the inner wall surfaces of the yoke 1 on the first-half rotor rotation sides as viewed in the rotation direction, the opening portions (each shown in FIG. 9(a) by a substantially triangular blank space) are secured so as not to block the passage of the magnetisms between the permanent magnet rotors 16 and 17 and between the permanent magnet rotors 17 and 18.

Further, stationary field coils 26-A, 26-B and stationary field coils 27-A, 27-B are provided close to base portions of the partitioning walls 20 in such a condition that they are located around the permanent magnet rotors 16 to 18. Further, a magnetic detector element 13 is provided around the permanent magnet rotor 18 and this detector element 13 is connected to the stationary field coils 26-A, 27-B and stationary field coils 26-B, 27-A through transistors T-1, T-2, resistors, and the like as shown in FIG. 9(b).

With the above-mentioned structure, as shown in FIG. 9(b), when a specified level of d.c. voltage is applied to each of the terminals, the magnetic detector element 13 detects the S pole of the permanent magnet rotor 18 and a voltage having a polarity of (+) is applied to the transistor T-1. As a result of this, the transistor T-1 is rendered conductive to energize the stationary field coils 26-A, 27-B which, in turn, magnetically attract the corresponding S poles of the permanent magnet rotors 16, 18. As a result, the permanent magnet rotors 16, 18 on both sides of the central permanent magnet rotor 17 start to rotate counterclockwise and this central permanent magnet rotor 17 to rotate clockwise. Subsequently, the magnetic detector element 13 detects the N pole of the permanent magnet rotor 18 and a (+) polarity voltage is applied to a base of the transistor T-2. As a result, the transistor T-2 is rendered conductive to energize the stationary field coils 26-B, 27-A which, in turn, magnetically attract the corresponding S poles of the permanent magnet rotor 17. Thus, a rotating force generates in the permanent magnet rotor 17 in the same direction as mentioned above. That is, required continuous rotations are obtained by alternately energizing the stationary field coils 26-A, 26-B and stationary field coils 27-A, 27-B.

When the above-mentioned rotations are made, forces of magnetic attraction act between the respective different magnetic poles of the permanent magnet rotors 16 to 18 opposing each other with the corresponding opening portions in between and this magnetic attraction force promotes the above-mentioned rotations of the permanent magnet rotors 16 to 18. Note that although the magnetic attractive force must act to hinder the rotations in the area between the mutually nearest positions between the respective outer peripheries of the rotors 16 to 18, and the inner wall surfaces of the yoke 1 on the second-half rotor rotation sides as viewed in the rotation direction since in such area the partitioning walls 20 are provided which block the passage of the magnetisms between the permanent magnet rotors 16 and 17 and between the permanent magnet rotors 17 and 18 and the stationary field coils 26-A, 26-B and the stationary field coils 27-A, 27-B are provided with the partitioning walls 20 in between, the effect of such counter rotation action can be avoided. On the other hand, it is possible to limit the rotations of the permanent magnet rotors 16 to 18 by blocking the opening portions during the rotations by use of the same partitioning walls as mentioned above.

Although in the above-mentioned fifth embodiment mode explanation has been made as being such that the composite motor has three permanent magnet rotors, two or more permanent magnet rotors may sufficiently serve the purpose, for example, a composite motor having four or more permanent magnet rotors can also operate in the same manner as mentioned above. In addition, the polar number of each permanent magnet rotor is not limited to 4 but may be an integral multiple of 2.

While there has been described what is at present considered to be preferred embodiments of the invention, it will be understood that various modifications may be made therein, and it is intended to cover in the appended claims all such modifications as fall within the true spirit and scope of the invention.

What is claimed is:

1. A composite motor, comprising:

a housing including a front bracket, a back bracket and a yoke, said yoke having an inner wall surface and surrounding said front and back brackets;

a first armature and a second armature, each of said armatures defining an outer periphery and having a rotary shaft and coils rotatably supported in parallel within said housing by said front and back brackets, each of said rotary shafts being provided with gears, said gears meshing with each other, wherein adjacent rotary shafts are interlockingly rotatable in opposite directions;

a partitioning wall disposed between each armature at a position between where the outer peripheries of adjacent armatures are nearest to each other and the inner wall surface of the yoke on a second-half armature rotation side of the armatures in a rotation direction, said partitioning wall providing a magnetic block between adjacent armatures;

an opening disposed between each armature at a position between where the outer peripheries of adjacent armatures are nearest to each other and the inner wall surface of the yoke on a first-half armature rotation side of the armatures in a rotation direction, said opening permitting magnetic communication between adjacent armatures; and stationary field members disposed adjacent the outer peripheries of said armatures at first and second positions with respect to each armature, said first position being located between where said armatures are closest to said partitioning wall and the inner wall surface of the yoke on a second-half armature rotation side of said armatures in a rotation direction, said second position being diametrically opposite said first position, said armatures being driven to rotate in opposite directions by interaction between an electric current flowing in the coils of said armatures and magnetic fluxes supplied by said stationary field members, and by forces of magnetic attraction acting between the coils of said armatures opposing each other at said opening disposed therebetween.

2. A composite motor, comprising:

a housing including a front bracket, a back bracket and a yoke, said yoke having an inner wall surface and surrounding said front and back brackets;

a first armature and a second armature, each of said armatures defining an outer periphery and having a rotary shaft and coils rotatably supported in parallel within said housing by said front and back brackets, each of said rotary shafts being provided with gears, said gears meshing with each other, wherein adjacent rotary shafts are interlockingly rotatable in opposite directions;

a partitioning wall disposed between each armature at a position between where the outer peripheries of adjacent armatures are nearest to each other and the inner wall surface of the yoke on a first-half armature rotation side of said armatures in a rotation direction, said partitioning wall providing a magnetic block between adjacent armatures;

an opening disposed between each armature, at a position between where the outer peripheries of adjacent armatures are nearest to each other and the inner wall surface of the yoke on a second-half armature rotation side of the armatures in a rotation direction, said opening permitting magnetic communication between adjacent armatures; and stationary field members disposed adjacent the outer peripheries of said armatures at first and second positions with respect to each armature, said first position being located between where said armatures are closest to said partitioning wall and the inner wall surface of the yoke on a first-half armature rotation side of said armatures in a rotation direction, said second position being diametrically opposite said first position, said armatures being driven to rotate in opposite directions by interaction between an electric current flowing in the coils of said armatures and magnetic fluxes supplied by said stationary field members, and by forces of magnetic repulsion acting between the coils of said armatures opposing each other at said opening disposed therebetween.

3. A composite motor, comprising:

a housing including a front bracket, a back bracket and a yoke, said yoke having an inner wall surface and surrounding said front and back brackets;

an armature defining an outer armature periphery and having coils;

permanent magnet rotors disposed on both sides of said armature, each of said permanent magnet rotors defining an outer rotor periphery and having a permanent magnet, said armature and said permanent magnet rotors being rotatably supported in parallel within said housing by said front and back brackets, said armature and said magnet rotors each having a rotary shaft, each of said rotary shafts being provided with gears, said gears meshing with each other, wherein the rotary shafts of said magnet rotors adjacent the rotary shaft of the armature are interlockingly rotatable in opposite directions;

a plurality of partitioning walls, each partitioning wall being disposed between the armature and each said magnetic rotor at a position between where the outer armature periphery and the outer rotor periphery of each magnet rotor are nearest to each other and the inner wall surface of the yoke on second-half armature rotation sides of the armature in a rotation direction, said partitioning walls providing a magnetic block between the armature and respective adjacent magnet rotors;

a plurality of openings disposed between the armature and each magnet rotor at a position between where the outer armature periphery and the outer rotor periphery of each magnet rotor are nearest to each other and the inner wall surface of the yoke on first-half armature rotation sides of the armature in a rotation direction, said openings permitting magnetic communication between the armature and respective adjacent magnet rotors; and said armature and said magnet rotors being driven to rotate in opposite directions, respectively, by interaction between an electric current flowing in the coils of said armature and magnetic fluxes supplied by said permanent magnet rotors, and by forces of magnetic attraction acting between the coils of said armature and corresponding magnetic poles of said permanent magnet rotors opposing each other at said openings disposed therebetween.

4. A composite motor, comprising:

a housing including a front bracket, a back bracket and a yoke, said yoke having an inner wall surface and surrounding said front and back brackets;

a plurality of permanent magnet rotors, each of said permanent magnet rotors defining an outer periphery and having a rotary shaft, said permanent magnet rotors being rotatably supported in parallel within said housing by said front and back brackets, each of said rotary shafts being provided with gears, said gears meshing with each other, wherein adjacent rotary shafts are interlockingly rotatable in opposite directions;

a plurality of partitioning walls disposed between each permanent magnet rotor at a position between where the outer peripheries of adjacent rotors are nearest to each other and the inner wall surface of the yoke on a second-half rotor rotation side of the rotors in a rotation direction, said partitioning walls providing a magnetic block between adjacent rotors;

a plurality of openings disposed between each permanent magnet rotor at a position between where the outer peripheries of adjacent rotors are nearest to each other and the inner wall surfaces of the yoke on a first-half rotor rotation side of the rotors in a rotation direction, said openings permitting magnetic communication between adjacent permanent magnet rotors; and a plurality of stationary field coils disposed at base portions of said partitioning walls and around their respective adjacent permanent magnet rotors, wherein adjacent permanent magnet rotors are driven to rotate in opposite directions by interaction between magnetic fluxes supplied from the permanent magnet rotors and an electric current flowing in the stationary field coils, and by forces of magnetic attraction acting between magnetic poles of the permanent magnet rotors opposing each other at said openings disposed therebetween.

\* \* \* \* \*